United States Patent
Takata (10) Patent No.: US 7,850,343 B2
(45) Date of Patent: Dec. 14, 2010

(54) MERCURY LIGHT SOURCE TUBE, A LIGHT SOURCE DEVICE HAVING THE MERCURY LIGHT SOURCE TUBE, A DISPLAY DEVICE, AND A TELEVISION RECEIVER

(75) Inventor: Yoshiki Takata, Suzuka (JP)

(73) Assignee: Sharp Kabushiki Kaisha, Osaka (JP)

(*) Notice: Subject to any disclaimer, the term of this patent is extended or adjusted under 35 U.S.C. 154(b) by 287 days.

(21) Appl. No.: 12/089,553
(22) PCT Filed: Jul. 4, 2006
(86) PCT No.: PCT/JP2006/313279

§ 371 (c)(1),
(2), (4) Date: Apr. 8, 2008

(87) PCT Pub. No.: WO2007/043220

PCT Pub. Date: Apr. 19, 2007

(65) Prior Publication Data

US 2009/0141479 A1    Jun. 4, 2009

(30) Foreign Application Priority Data

Oct. 14, 2005    (JP)    ............... 2005-300440

(51) Int. Cl.
F21V 29/00    (2006.01)
(52) U.S. Cl. .................. 362/294; 362/218; 362/264
(58) Field of Classification Search .......... 362/218, 362/97.1, 97.2, 97.4, 294, 264, 260–263, 362/547, 580, 126, 345, 373; 313/34, 22, 313/23, 24, 28, 35, 36
See application file for complete search history.

(56) References Cited

U.S. PATENT DOCUMENTS

| | | | |
|---|---|---|---|
| 2,425,697 A * | 8/1947 | Hultgren | ............ 313/34 |
| 5,869,931 A | 2/1999 | Terada | |
| 6,024,465 A | 2/2000 | Kobayashi | |
| 6,441,874 B1 | 8/2002 | Saito et al. | |
| 6,769,150 B1 * | 8/2004 | Liu et al. | ........... 315/169.3 |
| 6,839,100 B1 | 1/2005 | Saito et al. | |
| 2004/0155994 A1 | 8/2004 | Saito et al. | |

FOREIGN PATENT DOCUMENTS

| | | |
|---|---|---|
| JP | 36-22253 Y1 | 8/1961 |
| JP | 62-49853 U | 3/1987 |
| JP | 2000-149875 A | 5/2000 |
| JP | 2000-323099 A | 11/2000 |
| JP | 2001-15963 A | 1/2001 |
| JP | 2003-346716 A | 12/2003 |

OTHER PUBLICATIONS

Official communication issued in counterpart International Application No. PCT/JP2006/313279, mailed Oct. 10, 2006.
English translation of JP 62-49853 U published on Mar. 27, 1987.
English translation of JP 36-22253 Y1 published on Aug. 26, 1961.

* cited by examiner

Primary Examiner—Bao Q Truong
(74) Attorney, Agent, or Firm—Keating & Bennett, LLP (57) ABSTRACT

A mercury light source tube such that a detrimental effect on its lifetime caused by gathering of mercury at peripheral portions of electrodes can be prevented or controlled, a light source device, and a display device. The mercury light source tube has a tube body in which mercury is sealed, electrodes provided to the tube body, and projections provided on an outer surface of the tube body to be integral with the tube body. The projections are placed between the electrodes or in positions at a distance from the electrodes toward the tube body center. The projections locally increase the surface area of the tube body so as to easily radiate heat to the outside, and locally decrease temperatures of the positions where the projections are placed and their peripheral portions so that mercury gathers at the low temperature portions.

10 Claims, 7 Drawing Sheets

MERCURY LIGHT SOURCE TUBE, A LIGHT SOURCE DEVICE HAVING THE MERCURY LIGHT SOURCE TUBE, A DISPLAY DEVICE, AND A TELEVISION RECEIVER

BACKGROUND OF THE INVENTION

1. Field of the Invention

The present invention relates to a mercury light source tube such as a fluorescent tube, a light source device having the mercury light source tube, a display device, and a television receiver. The present invention specifically relates to a mercury light source tube suitable for a light source of a display panel such as a liquid crystal display panel, a light source device having the mercury light source tube, a display device, and a television receiver.

2. Description of the Related Art

A display device having a non-self-emissive display panel such as a translucent liquid crystal display panel generally has a light source device provided on a back side of the display panel. As a light source to be incorporated into the light source device, a mercury light source tube such as a fluorescent tube is widely used.

A generally used mercury light source tube includes a tube body made from transparent material such as glass, and electrodes provided at ends of the tube body. Rare gases and mercury are sealed in the tube body, and a thin layer of fluorescent material is formed on an inner surface of the tube body. Electric discharge between the electrodes makes electrons collide against mercury so as to generate ultraviolet light, and the generated ultraviolet light excites the fluorescent material so as to obtain visible light.

During the use of the mercury light source tube, electrons successively collide against the electrodes. When electrons collide against the electrodes, substances that make up the electrodes are dispersed, and dispersed substances and mercury in peripheral portions of the electrodes react with each other and form a mercury compound. Therefore, continuing the use of the mercury light source tube reduces mercury sealed in the tube body, which effectively acts on light emission. The reduction of mercury which effectively acts on light emission decreases an amount of light emitted, which lowers luminance, or the reduction of mercury which effectively acts on light emission stops light emission, which brings the mercury light source tube to the end of its lifetime. In order not to shorten the lifetime of the mercury light source tube, it is preferable to prevent mercury from gathering at the peripheral portions of the electrodes so as to prevent dispersed substances and mercury from reacting with each other.

One of the causes of the gathering of mercury at the peripheral portions of the electrodes is that temperatures in the peripheral portions of the electrodes of the tube body become lower than temperatures in other portions. In general, when a temperature of the tube body is locally lowered, the vapor pressure of mercury is lowered in the low temperature portion. Thus, a force to make the vapor pressure of mercury uniform is exerted in the tube body, and mercury moves to the low temperature portion. Accordingly, when the temperatures in the peripheral portions of the electrodes become lower than the temperatures in the other portions, mercury gathers at the peripheral portions of the electrodes.

Next, the causes of the lowering of the temperatures in the peripheral portions of the electrodes will be described. In general, the mercury light source tube to be incorporated into the light source device or the display device has light source holders made of rubber or resin material attached to the tube body in the peripheral portions of the electrodes. Harnesses arranged to provide electric power to the electrodes are drawn from the electrodes. Therefore, heat radiation through the light source holders or the harnesses may sometimes locally decrease the temperatures in the peripheral portions of the electrodes of the tube body. In addition, if the current is increased during the use of the mercury light source tube, a work function in the electrodes is lowered to decrease an amount of heat generation, so that the temperatures in the peripheral portions of the electrodes may sometimes become lower than the temperature of the gases sealed in the tube body. When the temperatures in the peripheral portions of the electrodes of the tube body become lower than the temperatures in other portions of the tube body, mercury gathers at the peripheral portions of the electrodes for the reasons described above, so that the mercury compound is apt to be generated. As a result, the lifetime of the mercury light source tube becomes short.

In view of the above, mercury is prevented from gathering at the peripheral portions of the electrodes by lowering the temperatures in the portions other than the peripheral portions of the electrodes of the mercury light source tube. For example, O-rings or other radiating members are provided on an outer surface of the tube body in positions at a distance from the electrodes. By such a configuration, the temperature of the tube body is locally lowered in the positions where the O-rings or other radiating members are provided or their peripheral portions, so that mercury gathers at the low temperature portions for the reason described above. As a result, mercury is prevented from gathering at the peripheral portions of the electrodes, and the speed of the reduction of mercury which effectively acts on light emission can be lowered.

However, in the configuration in which the O-rings or other radiating members are provided on the tube body, the number of components is increased, and the number of assembly processes of the light source device or the display device is increased, so that production cost is increased. In addition, if the radiating members are not placed accurately in given positions, mercury gathers at unexpected portions, so that the radiating members contrarily have a detrimental effect on the lifetime of the mercury light source tube. In addition, much expense is required in placing the radiating members accurately in the given positions, and the radiating members could be displaced from the given positions by coming into contact with other constituent members even after being placed.

As a prior art literature relating to the present invention, Japanese Patent Application Unexamined Publication No. Hei10-223182, Japanese Patent Application Unexamined Publication No. Hei11-134930, Japanese Patent Application Unexamined Publication No. 2000-214461, and Japanese Patent Application Unexamined Publication No. 2001-015963 are cited.

SUMMARY OF THE INVENTION

In order to overcome the problems described above, preferred embodiments of the present invention provide a mercury light source tube such that a detrimental effect on its lifetime caused by gathering of mercury at peripheral portions of electrodes can be prevented or controlled, a light source device having the mercury light source tube, a display device, and a television receiver. The preferred embodiments of the present invention also provide a mercury light source tube such that gathering of mercury at peripheral portions of electrodes can be prevented or controlled without increasing the number of components or the number of assembly processes, a light source device having the mercury light source tube, a display device, and a television receiver.

According to a preferred embodiment of the present invention, a mercury light source tube has a tube body in which mercury is sealed, electrodes provided to the tube body, and projections provided on an outer surface of the tube body so as to be integral with the tube body.

The projections are preferably placed between the electrodes provided to the tube body. In addition, the projections are preferably placed in positions at a distance from the electrodes provided to the tube body toward the center of the tube body.

In addition, the projections are preferably placed in positions asymmetrical with respect to the center in the longitudinal direction of the tube body.

In a preferred embodiment of the present invention, a plurality of the mercury light source tubes mentioned above are placed so that the tube bodies are oriented substantially in the same direction, and positions of the projections provided to the mercury light source tubes are made different from each other with respect to the longitudinal directions of the tube bodies.

For example, the projections preferably have a zigzag arrangement when the mercury light source tubes are placed.

According to another preferred embodiment of the present invention, a display device has the mercury light source tubes described above or a light source device having the mercury light source tubes described above, and a display panel.

According to another preferred embodiment of the present invention, a television receiver has the display device described above.

According to various preferred embodiments of the present invention, heat of the tube body can be radiated to the outside through the projections provided on the outer surface of the tube body. Therefore, a temperature of the tube body in positions where the projections are placed and their peripheral portions can be made lower than temperatures of other portions so as to allow mercury to gather about an inner surface at the low temperature portions. As a result, gathering of mercury at the peripheral portions of the electrodes and generation of a mercury compound can be prevented or controlled, so that the lifetime of the mercury light source tube can be prevented from becoming short.

By placing the projections between the electrodes provided to the tube body or in the positions at a distance from the electrodes toward the center of the tube body, the gathering of mercury at the peripheral portions of the electrodes can be effectively prevented or controlled.

In addition, by placing the plurality of the mercury light source tubes so that the tube bodies are oriented substantially in the same direction and the positions of the projections provided to the mercury light source tubes are made different from each other with respect to the longitudinal directions of the tube bodies, luminance irregularity or lowering of luminance can be prevented.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 7A and 7B are external perspective views illustrating modified examples of the mercury light source tube according to the preferred embodiment of the present invention.

DETAILED DESCRIPTION OF PREFERRED EMBODIMENTS

A detailed description of preferred embodiments of the present invention will now be given with reference to the accompanying drawings.

Figure 1:
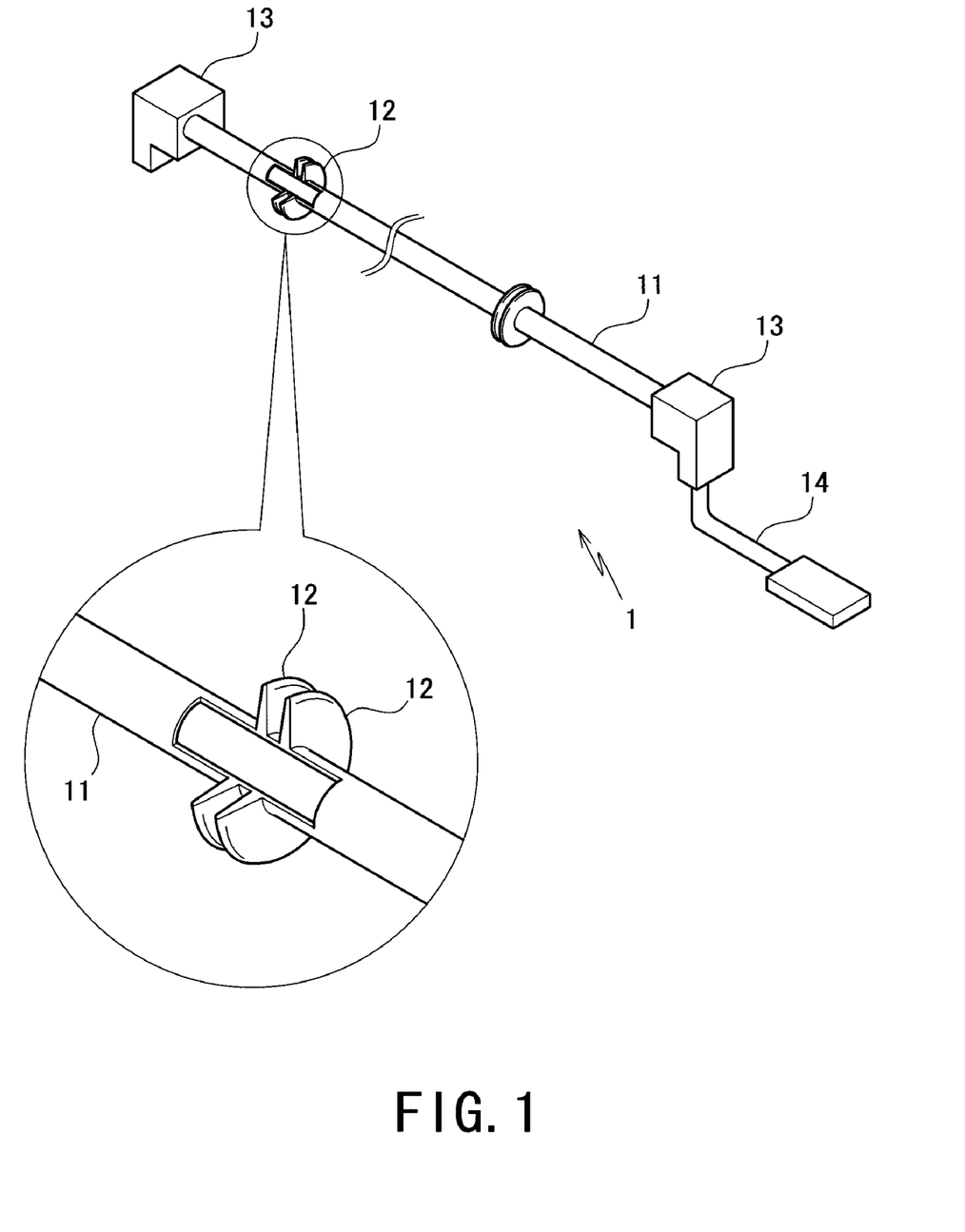
FIG. 1 is an external perspective view illustrating a configuration of a mercury light source tube according to a preferred embodiment of the present invention, which partially provides a sectional view.

FIG. 1 is an external perspective view illustrating a configuration of a mercury light source tube according to a preferred embodiment of the present invention, which partially provides a sectional view. A mercury light source tube 1 according to the present preferred embodiment of the present invention has a tube body 11 made of transparent material such as glass, and electrodes (not shown) provided in peripheral portions of ends of the tube body 11. A harness 14 arranged to apply voltage to each electrode is drawn from the electrode.

Rare gases and mercury are sealed in the tube body 11, and a thin layer of fluorescent material (not shown) is formed on an inner surface of the tube body 11. On an outer surface of the tube body 11, projections 12 are placed in given positions. The positions where the projections 12 are placed will be described later. The mercury light source tube 1 has light source holders 13 made of rubber or resin material attached to the ends of the tube body 11.

The mercury light source tube 1 according to the present preferred embodiment of the present invention has the same structure as a conventional mercury light source tube except for the projections 12, and detailed descriptions thereof are omitted.

As shown in FIG. 1, the projections 12 extend from the outer surface of the tube body 11 toward the outside of the tube body 11. The projections 12 partially enlarge the surface area of the outer surface of the tube body 11 so as to easily radiate heat of the tube body 11 in the positions where the projections 12 are placed and their peripheral portions to the outside. In the present preferred embodiment of the present invention, the projections 12 have the shape of a ring along a circumference of the tube body 11. However, the shape of the projections 12 is not limited in particular.

The projections 12 are formed so as to be integral with the tube body 11. Therefore, different from a conventional configuration in which O-rings or other members are provided on an outer surface of a tube body, the projections 12 once provided are not displaced on the outer surface of the tube body 11 after being provided. In order to form the projections 12 so as to be integral with the tube body 11, components to be the projections 12 are bonded or welded to the tube body 11. Material of the projections 12 is not specifically limited, and material of the same type as the tube body 11 of the mercury light source tube 1 can be used.

By forming the projections 12 described above, the surface area of the outer surface of the tube body 11 is locally increased in the positions where the projections 12 are placed. Accordingly, heat of the tube body 11 is radiated to the outside more easily through the positions where the projections 12 are placed and their peripheral portions than through portions where the projections 12 are not provided. During the use of the mercury light source tube 1, temperatures in the positions where the projections 12 are placed and their peripheral portions become lower than temperatures in the portions where the projections 12 are not provided. Because mercury sealed in the tube body 11 has a property of gathering at the lower temperature portions of the tube body 11, i.e., the positions where the projections 12 are placed and their peripheral portions, gathering of mercury at the peripheral portions of the electrodes is thereby prevented or controlled.

During the use of the mercury light source tube 1, electrons successively collide against the electrodes. When electrons collide against the electrodes, substances that make up the electrodes are dispersed from the electrodes. If mercury exists in a position which dispersed substances reach, dispersed substances and mercury react with each other and form a mercury compound, so that mercury which effectively acts on light emission are decreased. In order to prevent or control the decrease of mercury by the formation of the mercury compound, mercury is preferably prevented from gathering at the position which dispersed substances from the electrodes easily reach.

In order to prevent mercury from gathering at the peripheral portions of the electrodes, the projections 12 are placed in positions at a given distance from the electrodes. The given distance is set so that dispersed substances made by the collision of electrons against the electrodes do not reach the projections 12 or so that an amount of dispersed substances which reach the projections 12 is made less. Though the given distance differs according to the structure or the status of use of the mercury light source tube 1, it is preferably about 10 mm or more from the electrodes. Thus, mercury is prevented from gathering at the positions in the peripheral portions of the electrodes where a large amount of dispersed substances from the electrodes reach, and the speed of the reduction of mercury which effectively acts on light emission can be lowered.

Meanwhile, when the projections 12 are placed on the outer surface of the tube body 11, an amount of light emitted to the outside through the projections 12 is sometimes decreased albeit only slightly, which lowers luminance. Therefore, the positions where the projections 12 are placed are preferably out of a region in which light emission is effectively performed or a region in which images are effectively displayed in the state of the mercury light source tube 1 being incorporated in a light source device or a display device. If the projections 12 are not placed out of the region, it is preferable to place the projections 12 in positions as far as possible from the center of the region.

Accordingly, when the tube body 11 is linear as shown in FIG. 1, the projections 12 are preferably placed in positions which are in the peripheral portions of the ends of the tube body 11 and at the given distance from the electrodes.

Next, descriptions of a light source device and a display device according to preferred embodiments of the present invention which include the mercury light source tubes 1 according to the above-described preferred embodiment of the present invention will be provided.

Figure 2:
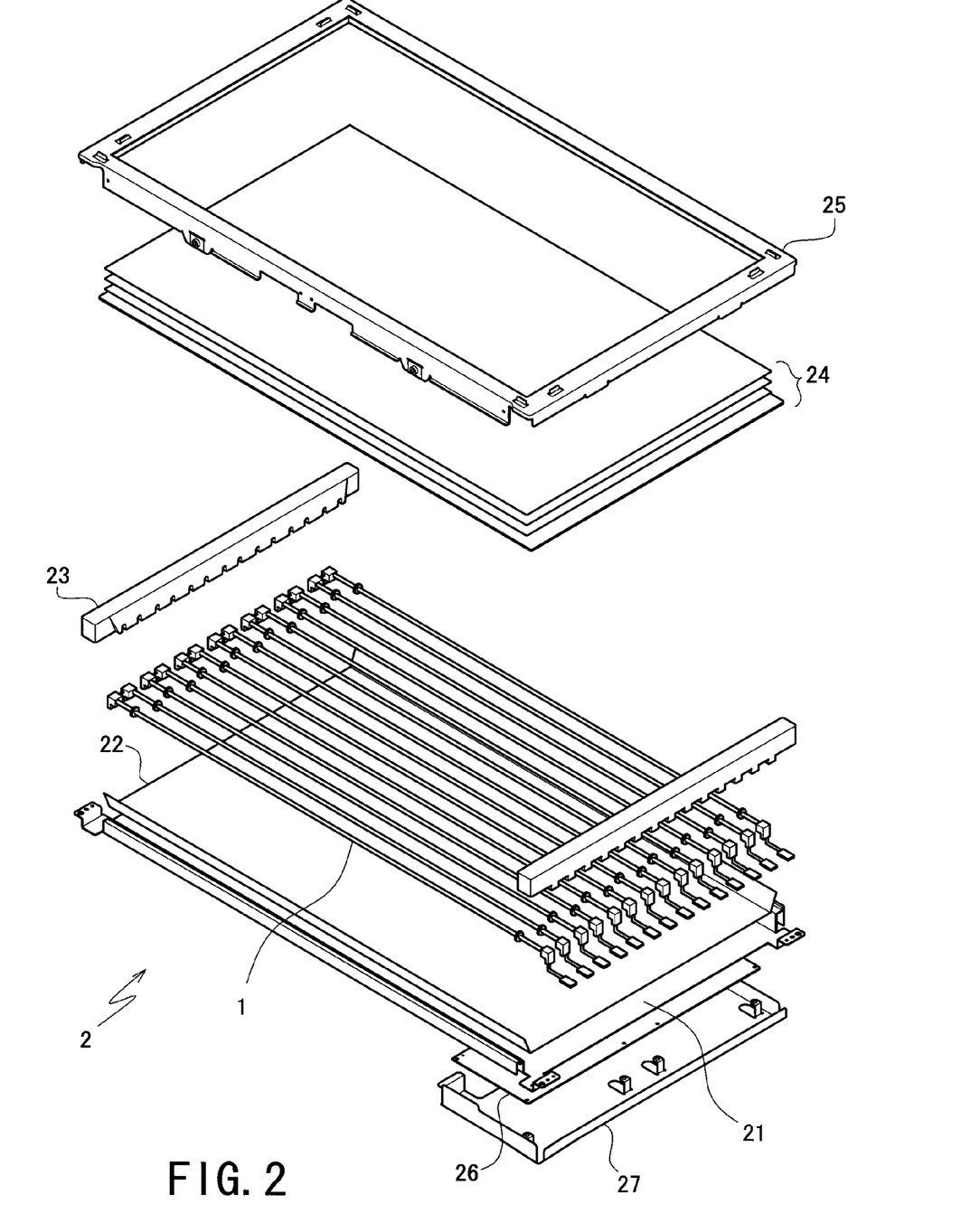
FIG. 2 is an exploded perspective view schematically illustrating a configuration of a light source device according to another preferred embodiment of the present invention which includes the mercury light source tubes.

FIG. 2 is an exploded perspective view schematically illustrating a configuration of a light source device 2 according to the present preferred embodiment of the present invention which includes the mercury light source tubes 1. In FIG. 2, the display device is illustrated so that its front surface faces toward the top of FIG. 2, and its back surface faces toward the bottom of FIG. 2, for the purpose of illustration.

The light source device 2 includes a chassis 21, a plurality of the mercury light source tubes 1, a reflection sheet 22 arranged to reflect light emitted from the mercury light source tubes 1 diffusely, optical sheets 24 arranged to control the properties of the light emitted from the mercury light source tubes 1, side holders 23 arranged to function as a spacer for the optical sheets 24, and a frame 25 arranged to support the optical sheets 24 on the chassis 21. The light source device 2 further includes a light source driving circuit board 26 arranged to drive the mercury light source tubes 1, a light source driving circuit board cover 27 arranged to cover the light source driving circuit board 26, and other given constituent members not shown.

For the chassis 21, the reflection sheet 22, the side holders 23, the optical sheets 24, the frame 25, the light source driving circuit board 26, and the light source driving circuit board cover 27, conventional ones can be used, and descriptions thereof are omitted.

Figure 3:
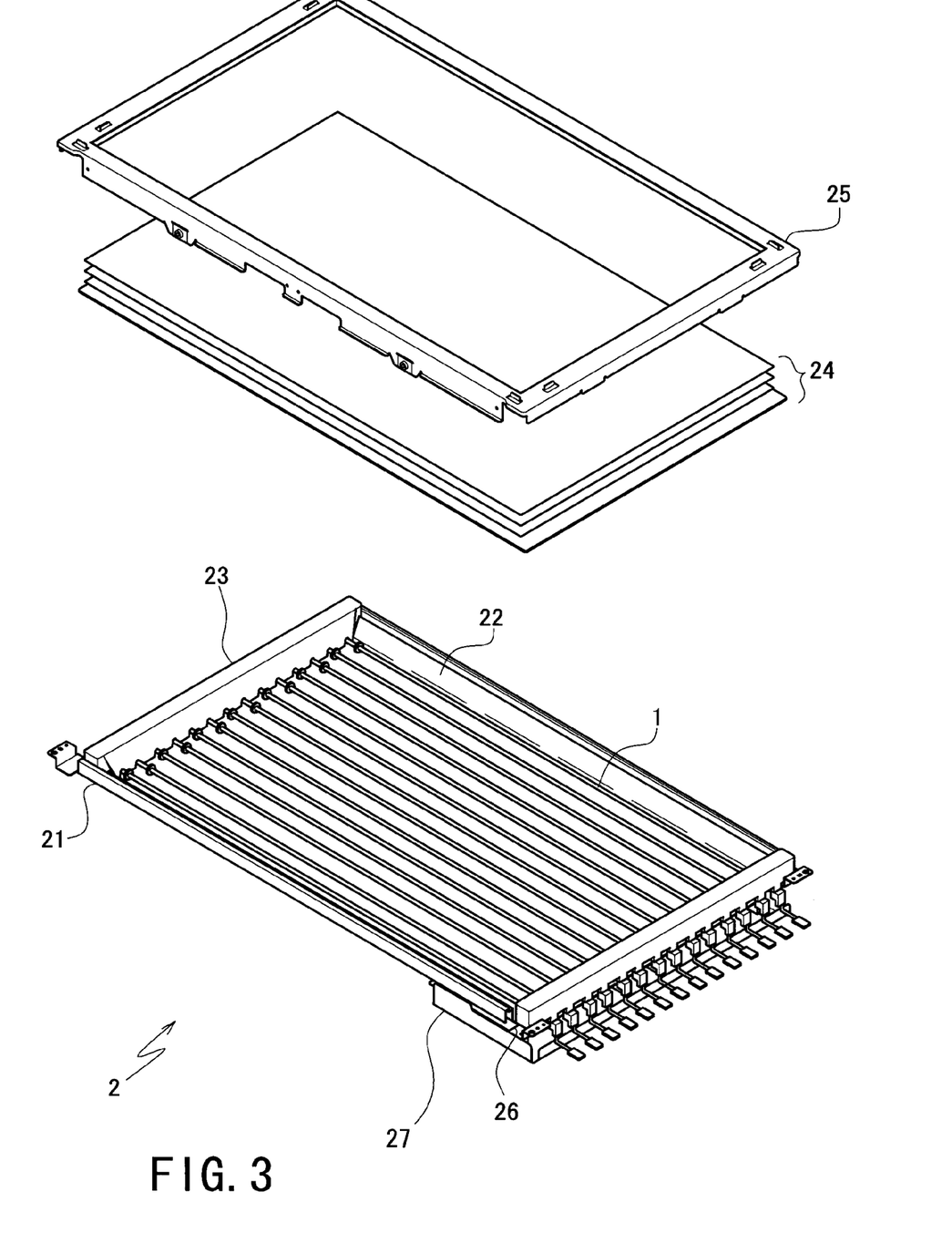
FIG. 3 is a partial exploded perspective view schematically illustrating a structure for assembling the light source device including the mercury light source tubes.

Assembly of the light source device 2 including the above-described constituent members will be described. FIG. 3 is a partial exploded perspective view schematically illustrating a structure for assembling the light source device 2. The reflection sheet 22 is laid on a front surface of the chassis 21, and the mercury light source tubes 1 are placed side by side on a front surface of the reflection sheet 22 so that the tube bodies 11 are oriented substantially in the same direction. In this state, the side holders 23 are attached to the shorter edges of the chassis 21. The optical sheets 24 are placed on front surfaces of the chassis 21 and the side holders 23, and the frame 25 is attached to a front surface of the optical sheets 24. To a back surface of the chassis 21, the light source driving circuit board 26 and the light source driving circuit board cover 27 are attached.

Figure 4:
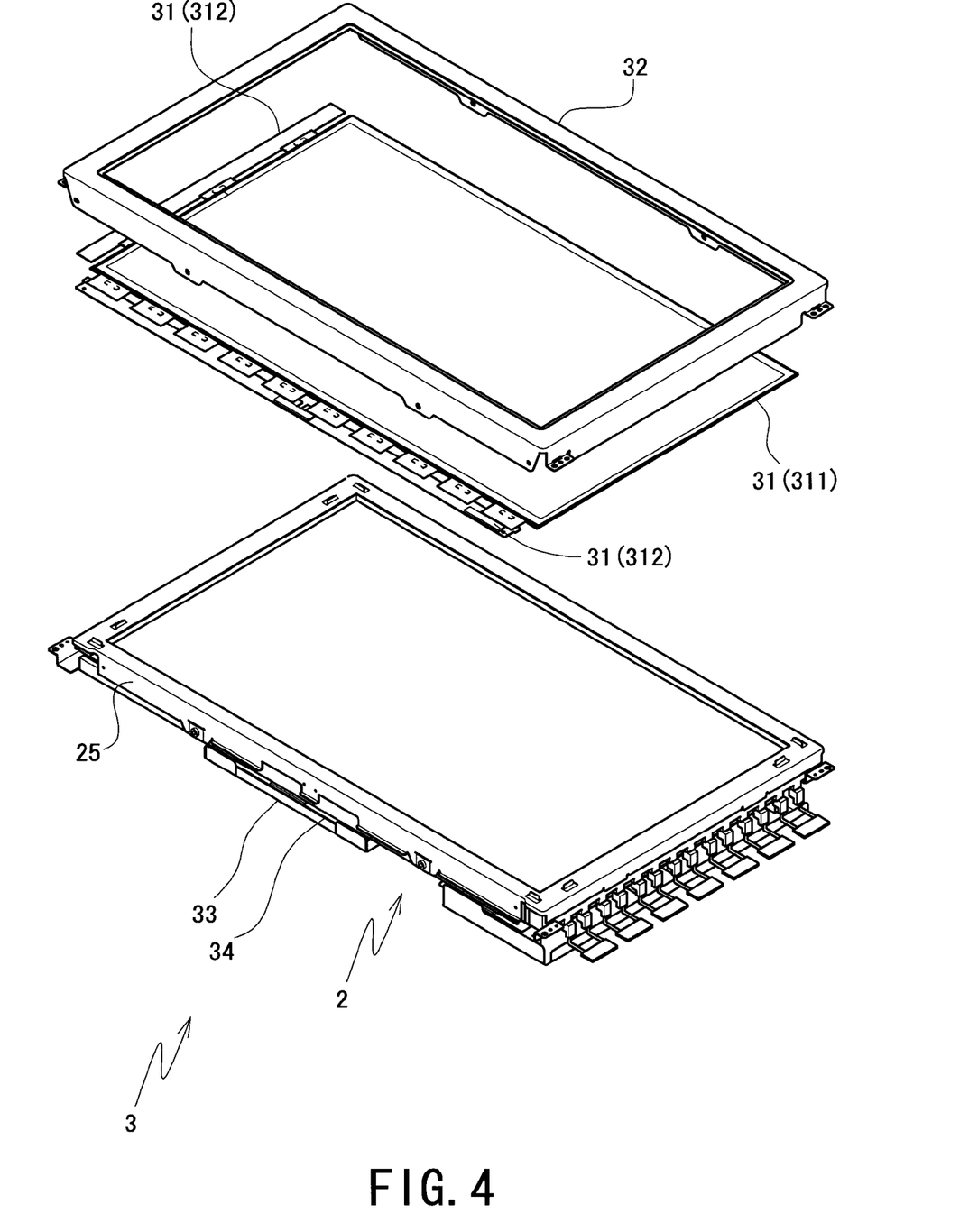
FIG. 4 is an exploded perspective view schematically illustrating a configuration of a display device according to another preferred embodiment of the present invention which includes the mercury light source tubes.

FIG. 4 is an exploded perspective view schematically illustrating a configuration of a display device 3 according to the present preferred embodiment of the present invention. The display device 3 includes the light source device 2 assembled as described above, a liquid crystal module 31, a bezel 32, a control circuit board 33, a control circuit board cover 34, and other given constituent members not shown.

The liquid crystal module 31 includes a liquid crystal display panel 311, a circuit board on which drivers arranged to drive the liquid crystal display panel 311 are mounted, and films 312. The circuit board and the films 312 are attached to peripheral portions of the liquid crystal display panel 311. The bezel 32 is a member having a substantially square shape with an opening, which is preferably made from metal plate material by preferably performing press working thereon. The control circuit board 33 produces a signal to control the liquid crystal display panel 311. The control circuit board cover 34 covers the control circuit board 33. For these constituent members, conventional ones can be used, and detailed descriptions thereof are omitted.

Assembly of the display device 3 including the above-described constituent members will be described. The liquid crystal module 31 is placed on a front surface of the frame 25 of the light source device 2, and the bezel 32 is attached to a front surface of the liquid crystal module 31. The control circuit board 33, the control circuit board cover 34 and other given constituent members are attached to a back surface of the light source device 2.

Figure 5:
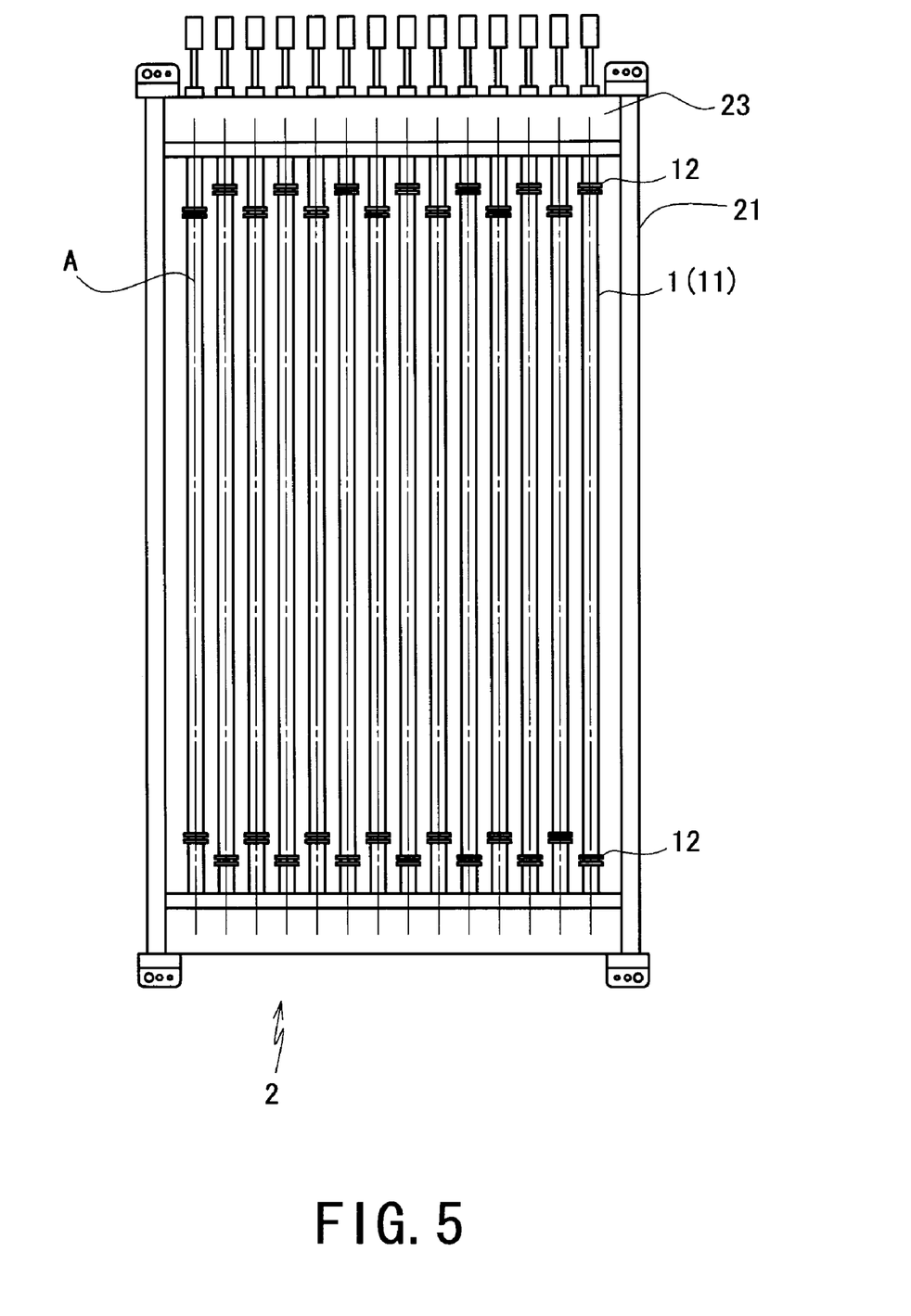
FIG. 5 is a plan view schematically illustrating the placement of the mercury light source tubes in the light source device.

The placement of the mercury light source tubes 1 in the light source device 2 or the display device 3 described above will be described. FIG. 5 is a plan view schematically illustrating the placement of the mercury light source tubes 1 in the light source device 2 according to the present preferred embodiment of the present invention. To be specific, FIG. 5 is a view showing an assembly of the chassis 21, the mercury light source tubes 1 and the side holders 23 shown in FIG. 3 when viewed from the front side.

In the mercury light source tubes 1 according to the above-described preferred embodiment of the present invention in which the projections 12 are provided on the outer surface of the tube bodies 11, an amount of light emitted to the outside of the tube bodies 11 is sometimes decreased albeit only slightly at the projections 12, which makes luminance non-uniform albeit only slightly. Therefore, when a plurality of the mercury light source tubes 1 according to the above-described preferred embodiment of the present invention are incorporated into the light source device 2, if the projections 12 provided to the tube bodies 11 of the mercury light source tubes 1 are placed to be concentrated in a specific region, or if the projections 12 are placed to be aligned linearly along a specific direction, the slight decreases in the amount of light at the projections 12 are concentrated in the specific region or along the specific direction. As a result, luminance of the light source device 2 could be made irregular or lowered.

In view of the above, in the light source device 2 according to the present preferred embodiment of the present invention, the mercury light source tubes 1 are placed in the following manner. The mercury light source tubes 1 are placed so that the adjacent projections 12 provided to the tube bodies 11 of the mercury light source tubes 1 are displaced from each other in the longitudinal direction A of the tube bodies 11. In addition, the mercury light source tubes 1 are placed so that the projections 12 provided to the tube bodies 11 of the mercury light source tubes 1 placed side by side are not aligned linearly along a specific direction. The specific direction preferably includes a perpendicular direction and an oblique direction with respect to the longitudinal direction A of the tube bodies 11 of the mercury light source tubes 1.

The placement described above prevents the slight decreases in the amount of light at the projections 12 from being concentrated in the specific region or along the specific direction, and prevents the slight decreases from being recognized visually by users even if the slight decreases are concentrated. As a result, display quality of the display device 3 using the light source device 2 can be improved.

As shown in FIG. 5, the projections 12 provided to the tube bodies 11 of the mercury light source tubes 1 are preferably in a zigzag arrangement relative to a row direction of the mercury light source tubes 1. Owing to this arrangement, the projections 12 are placed not to be concentrated in the specific region or not to be aligned linearly along the specific direction, so that display quality can be improved.

The zigzag configuration of the projections 12 provided to the tube bodies 11 of the mercury light source tubes 1 relative to the row direction of the mercury light source tubes 1 includes the following two configurations. In the first configuration, two types of mercury light source tubes 1 different in the positions where the projections 12 are placed are used, and the two types of mercury light source tubes 1 are alternately placed. In the second configuration, the mercury light source tubes 1 of one type in which the projections 12 are placed in positions asymmetrical with respect to the center in the longitudinal direction A of the tube bodies 11 are used, and the mercury light source tubes 1 are alternately oriented in opposite directions.

Owing to the configurations described above, the projections 12 provided to the tube bodies 11 of the mercury light source tubes 1 are in the zigzag arrangement relative to the row direction of the mercury light source tubes 1. In the configuration in which the mercury light source tubes 1 in which the projections 12 are placed in the positions asymmetrical with respect to the center in the longitudinal direction A of the tube bodies 11, the mercury light source tubes 1 of only one type are used, and there is no need to prepare a plurality of types of mercury light source tubes 1 different in the positions where the projections 12 are placed.

Figure 6:
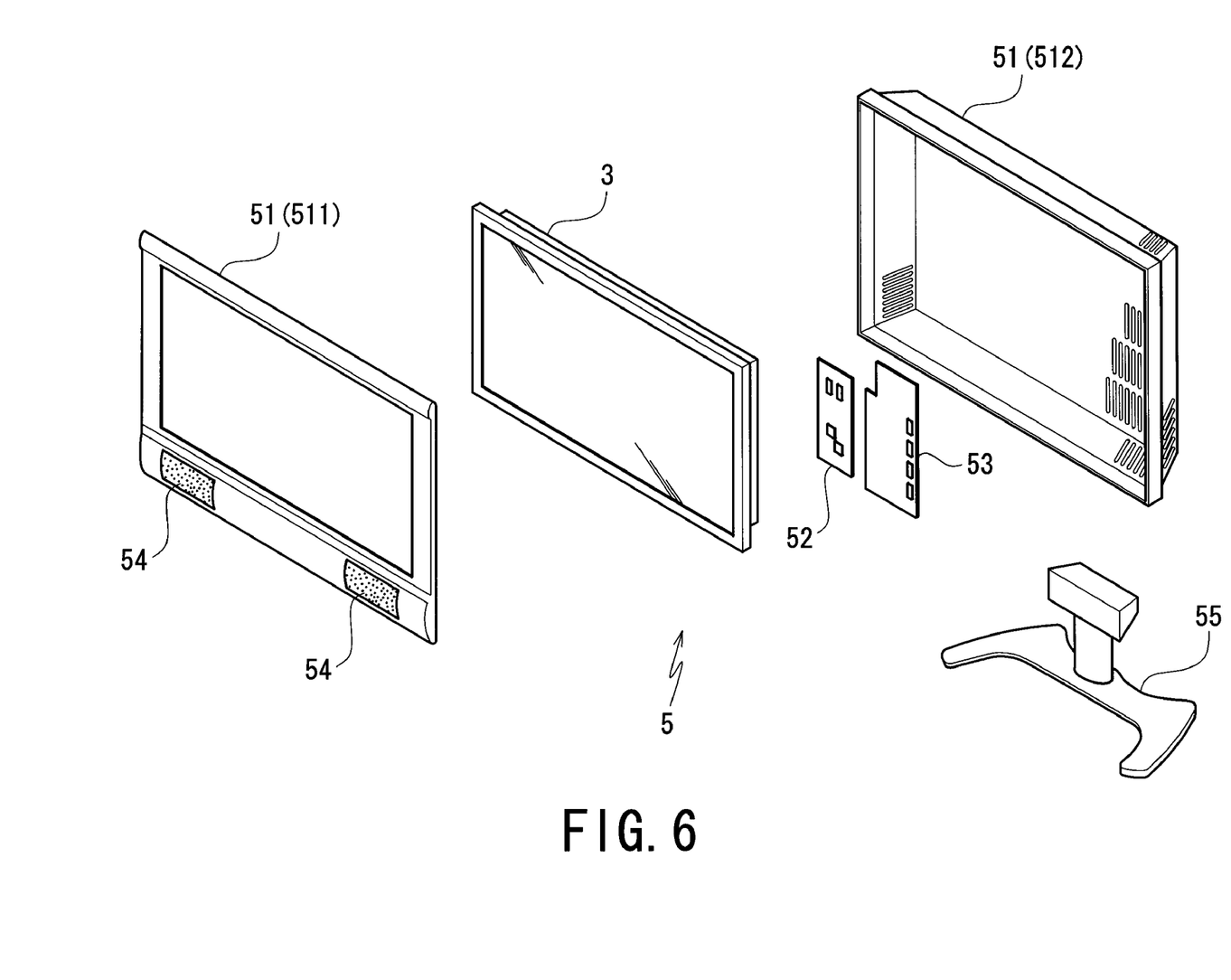
FIG. 6 is an exploded perspective view illustrating an example of a configuration of a television receiver according to another preferred embodiment of the present invention which includes the display device.

Next, a description of a television receiver according to another preferred embodiment of the present invention which includes the display device mentioned above will be provided. FIG. 6 is an exploded perspective view illustrating an example of a configuration of the television receiver including the display device according to the above-described preferred embodiment of the present invention. A television receiver 5 includes a tuner 52 that produces an image signal and a sound signal of a given channel based on received radio waves and a signal inputted from the outside, the display device 3 that displays an image based on the image signal produced by the tuner 52, loudspeaker mechanisms 54 that produce a sound based on the sound signal produced by the tuner 52, and an electric power supply board 53 that supplies electric power to the tuner 52, the display device 3 and the loudspeaker mechanisms 54.

For the tuner 52, a conventional terrestrial tuner (analog, digital, or both), a BS tuner, or a CS tuner can be used. For the loudspeaker mechanisms 54, a conventional loudspeaker mechanism such as a generally used loudspeaker can be used. Hence, detailed descriptions thereof are omitted. For the display device 3, the display device 3 according to the above-described preferred embodiment of the present invention can be used.

As shown in FIG. 6, the display device 3, the tuner 52, the loudspeaker mechanisms 54 and the electric power supply board 53 are housed in a cabinet 51 (the cabinet 51 in FIG. 6 includes a front side cabinet 511 and a back side cabinet 512) and is supported by a stand 55. Alternatively, the tuner 52, the loudspeaker mechanisms 54 and the electric power supply board 53 are mounted on the display device 3.

When the display device is used while being incorporated in the television receiver, a long lifetime has the most importance for the television receiver. By using the display device according to the above-described preferred embodiment of the present invention, the television receiver having a long lifetime can be provided.

The foregoing descriptions of the preferred embodiments and the implementation example of the present invention have been presented for purposes of illustration and description with reference to the drawings. However, it is not intended to limit the present invention to the preferred embodiments, and modifications and variations are possible as long as they do not deviate from the principles of the present invention.

Figure 7A:
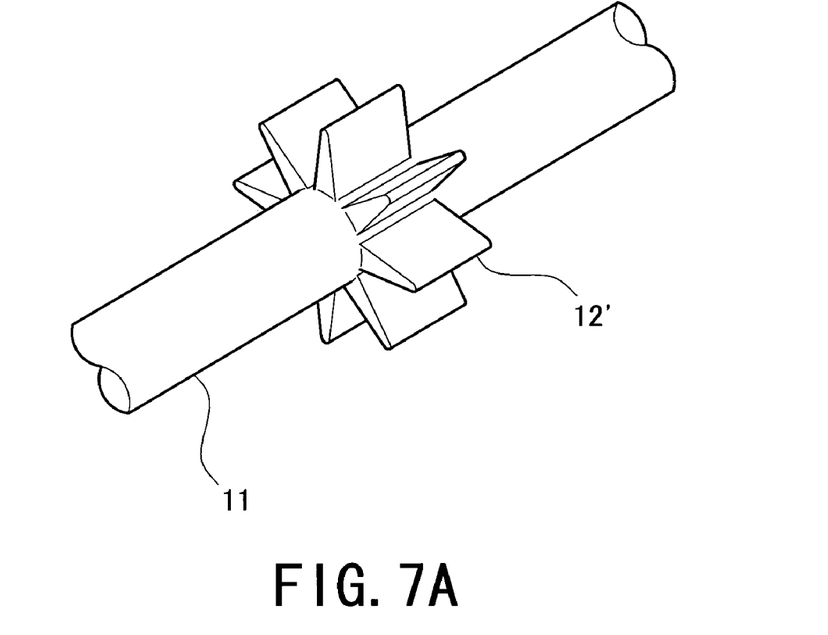
FIG. 7A shows a configuration in which projections have the shape of a plate.
Figure 7B:
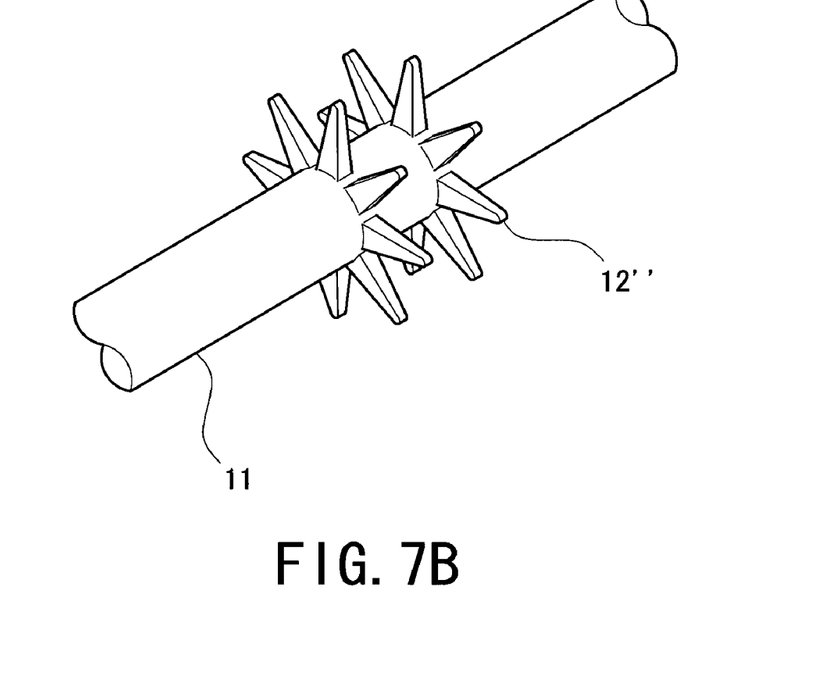
FIG. 7B shows a configuration in which projections have the shape of a column.

For example, the shape of the projections 12 is not limited to the shape described in the above-described preferred embodiments of the present invention, and various shapes can be used. FIGS. 7A and 7B are partial enlarged views showing modified examples of the projections 12. In FIG. 7A, projections 12' having the shape of a plate are provided parallel to the longitudinal direction of the tube body 11. In FIG. 7B, projections 12" having the shape of a column are provided in a standing manner on the outer surface of the tube body 11. It is essentially only that the projections are provided so as to locally increase the surface area of the outer surface of the tube body 11 of the mercury light source tube 1 and thereby increase the amount of heat radiation as compared to other portions where the projections are not provided.

The positions where the projections are placed and the number of the projections are not limited to the above-described preferred embodiments of the present invention. For example, the projections may be placed in the vicinity of the center of the tube body. In addition, a plurality of projections may be placed at predetermined intervals.

In the above-described preferred embodiments of the present invention, the tube body of the mercury light source tube is linear. However, the shape of the tube body is not specifically limited. For example, an arbitrary shaped tube body such as a U-shaped tube can be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A mercury light source tube comprising:
   a tube body in which mercury is sealed;
   electrodes provided to the tube body; and
   projections having a shape of a plate or a column, arranged to radiate heat of the tube body to the outside, and provided on an outer surface of the tube body so as to be integral with the tube body.

2. The mercury light source tube according to claim 1, wherein the projections are placed between the electrodes provided to the tube body.

3. The mercury light source tube according to claim 1, wherein the projections are placed in positions at a distance from the electrodes provided to the tube body toward the center of the tube body.

4. The mercury light source tube according to claim 1, wherein the projections are placed in positions asymmetrical with respect to the center in the longitudinal direction of the tube body.

5. A light source device comprising the mercury light source tube according to claim 1.

6. The light source device according to claim 5, wherein a plurality of the mercury light source tubes are arranged such that the projections are provided at different in positions in the longitudinal directions of the mercury light source tubes and are placed so that the tube bodies are oriented substantially in the same direction, and positions of the projections provided to the mercury light source tubes are different from each other with respect to the longitudinal directions of the tube bodies.

7. The light source device according to claim 6, wherein the positions of the projections provided to the mercury light source tubes are alternately different so that the projections provided to the mercury light source tubes have a zigzag arrangement.

8. A display device comprising:
   the light source device according to claim 5; and
   a display panel.

9. A television receiver comprising the display device according to claim 8.

10. The light source device according to claim 5, wherein the projections provided to each of a plurality of the mercury light source tubes are placed in positions such that the projections are arranged to be asymmetrical with respect to a center in the longitudinal direction of the mercury light source tubes, and the mercury light source tubes are oriented alternately in opposite directions so that the projections provided to the mercury light source tubes have a zigzag arrangement.

\* \* \* \* \*